United States Patent
Mayer et al.

(10) Patent No.: US 7,712,304 B2
(45) Date of Patent: May 11, 2010

(54) METHOD FOR AFTER TREATMENT OF EXHAUST GASES, AND EXHAUST GAS AFTER TREATMENT ARRAY

(75) Inventors: Thorsten Mayer, Worms (DE); Christian Walz, Leonberg (DE); Johannes Schaller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 10/534,125

(22) PCT Filed: Jul. 10, 2003

(86) PCT No.: PCT/DE03/02311

§ 371 (c)(1),
(2), (4) Date: Nov. 18, 2005

(87) PCT Pub. No.: WO2004/042207

PCT Pub. Date: May 21, 2004

(65) Prior Publication Data

US 2006/0117741 A1    Jun. 8, 2006

(30) Foreign Application Priority Data

Nov. 6, 2002    (DE) .................................. 102 51 472

(51) Int. Cl.
*F01N 3/00* (2006.01)
(52) U.S. Cl. .............................. 60/286; 60/274; 60/295; 60/301; 60/303

(58) Field of Classification Search ................... 60/274, 60/275, 284, 286, 295, 301, 303
See application file for complete search history.

(56) References Cited

U.S. PATENT DOCUMENTS

| | | | | |
|---|---|---|---|---|
| 5,921,076 A | * | 7/1999 | Krutzsch et al. | 60/274 |
| 5,992,141 A | * | 11/1999 | Berriman et al. | 60/274 |
| 6,109,024 A | * | 8/2000 | Kinugasa et al. | 60/285 |
| 6,122,909 A | * | 9/2000 | Murphy et al. | 60/286 |
| 6,343,468 B1 | | 2/2002 | Doelling et al. | |
| 6,739,125 B1 | * | 5/2004 | Mulligan | 60/286 |
| 6,871,491 B2 | * | 3/2005 | Breuer et al. | 60/286 |
| 6,895,746 B2 | * | 5/2005 | Buglass et al. | 60/286 |
| 2002/0038542 A1 | * | 4/2002 | Akama et al. | 60/283 |

FOREIGN PATENT DOCUMENTS

| | | |
|---|---|---|
| DE | 199 13 462 A1 | 9/2000 |
| EP | 0 894 523 A1 | 2/1999 |
| WO | WO 99/56858 A2 | 11/1999 |

* cited by examiner

*Primary Examiner*—Thomas Denion
(74) *Attorney, Agent, or Firm*—Ronald E. Greigg

(57) ABSTRACT

A method and an apparatus for posttreatment of the exhaust gases of an internal combustion engines in which nitric oxides contained in the exhaust gas can be selectively catalytically reduced, and a first auxiliary agent kept on hand can be delivered to the exhaust gas, and means are provided for at least intermittently subjecting a portion of the first auxiliary agent to a chemical conversion into a second auxiliary agent, and an intermediate reservoir is provided for storing the second auxiliary agent, so that at least intermittently, the second auxiliary agent can be delivered to the exhaust gas parallel to or in alternation with the first auxiliary agent.

9 Claims, 1 Drawing Sheet

METHOD FOR AFTER TREATMENT OF EXHAUST GASES, AND EXHAUST GAS AFTER TREATMENT ARRAY

CROSS-REFERENCE TO RELATED APPLICATIONS

This application is a 35 U.S.C 371 application of PCT/DE 03/02311 filed Jul. 10, 2003.

BACKGROUND OF THE INVENTION

1. Field of the Invention

The invention directed to an improved a method of and an apparatus for posttreatment of the exhaust gas of an internal combustion engine.

2. Description of the Prior Art

German Patent Disclosure DE 197 20 209, discloses one known method in which ammonia is introduced into the exhaust gas system upstream of a catalytic converter for selective catalytic reduction.

SUMMARY AND ADVANTAGES OF THE INVENTION

The method and apparatus according to the invention have the advantage over the prior art of assuring a sufficient selective catalytic reduction of nitric oxides, with minimized energy needs for furnishing an auxiliary agent that is active at low temperatures. The advantages of using two different auxiliary agents are that, especially in a temperature range of around 100° C. to around 180°, only one of the two auxiliary agents needs to be active at low temperatures, and that this second auxiliary agent needs to be furnished, using energy, only in operating situations in which the first auxiliary agent does not assure adequate removal of nitric oxides from the exhaust gas.

Advantageous refinements of and improvements to the method and apparatus are disclosed. It is especially advantageous to provide for conversion of the first auxiliary agent into a second auxiliary agent only in a so-called normal operating mode of the motor vehicle, so that for the next cold start of the engine, the required amount of low-temperature-active second auxiliary agent will already be available. Initiating the conversion while the engine is warm also has the advantage that if needed, the waste heat of the engine or the heat of the exhaust gas can be used to speed up the chemical conversion. In any case, the load on the vehicle battery is less when additional consumers, such as an electric heater for a chemical reactor, need not be supplied with electrical energy immediately upon starting of the engine.

It is also advantageous to provide an intermediate reservoir that is dimensioned such that the quantity of second auxiliary agent stored in it suffices to assure removal of nitric oxides from the exhaust gas under special vehicle conditions, in which the first auxiliary agent would not achieve good enough results.

It is also advantageous to perform the chemical conversion only until the intermediate reservoir is full; this assures economical use of any electrical energy that may be needed.

BRIEF DESCRIPTION OF THE DRAWINGS

Exemplary embodiments of the invention are described herein below, with reference to the sole drawings figure which shows an apparatus for posttreatment of the exhaust gas of an internal combustion engine by means of the method of selective catalytic reduction.

DESCRIPTION OF THE PREFERRED EMBODIMENTS

Figure 1:
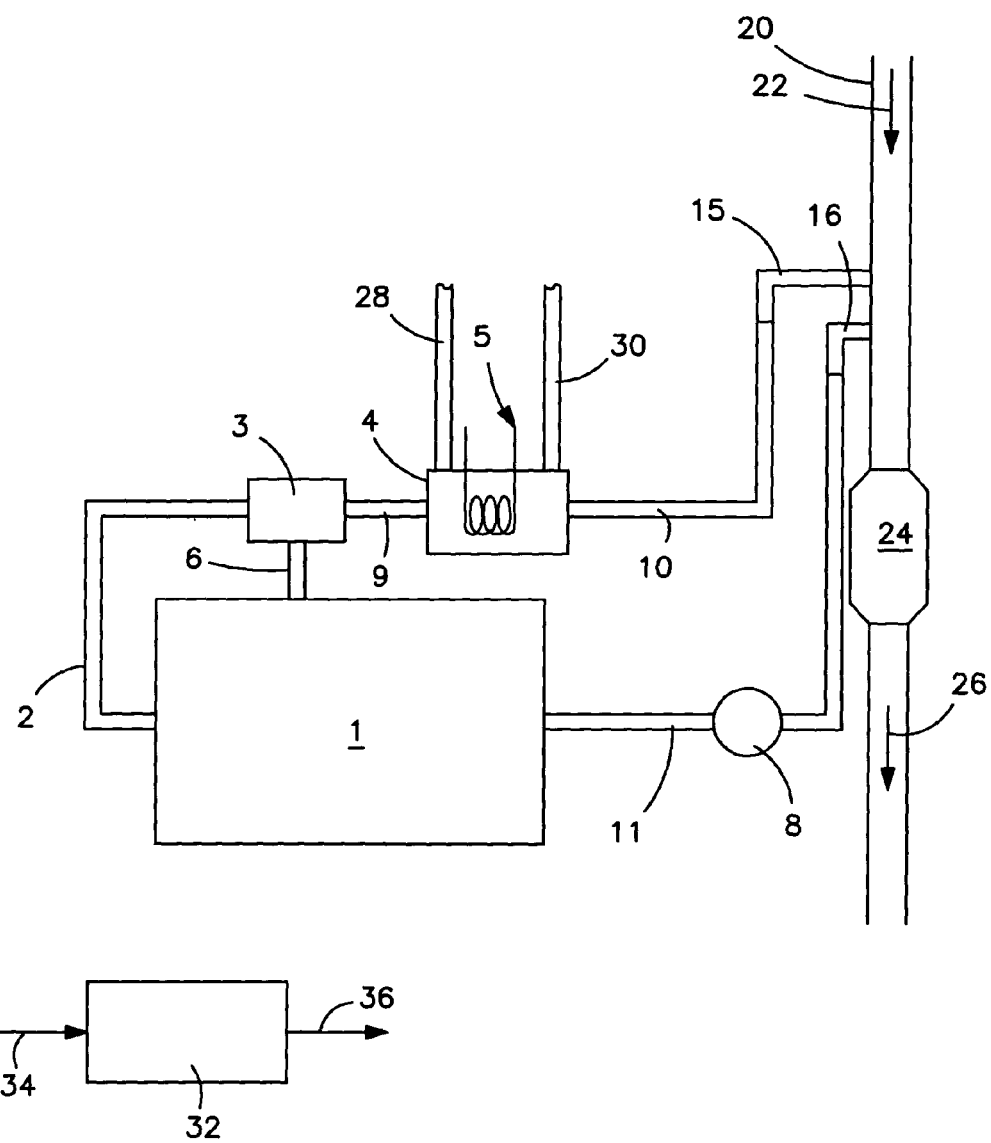
FIG. 1, the sole drawings figure, shows an apparatus for posttreatment of the exhaust gas of an internal combustion engine by means of the method of selective catalytic reduction.

In FIG. 1, an apparatus for exhaust gas posttreatment is shown, with two metering devices 15 and 16 that protrude into an exhaust gas line 20. Reference numeral 22 marks the flow direction of the exhaust gas originating in an internal combustion engine; that is, the metering devices, embodied as electrically triggerable valves, are located upstream of a catalytic converter 24 for selective catalytic reduction (selective catalytic reduction catalytic converter). Downstream of the selective catalytic reduction catalytic converter 24, exhaust gas 26 from which nitric oxides have been removed leaves the vehicle, optionally after flowing through other devices for exhaust gas posttreatment, and reaches the open air. The apparatus includes a reducing-agent tank 1, for instance containing a urea-water solution (UWS), which via a reducing-agent line 11 and a feeding device 8 embodied as a pump supplies the electrically triggerable valve 16 with the urea-water solution. A reactor 3 is also provided, which is supplied with urea-water solution from the reducing-agent tank 1 via a line 2. A return line 6 is also provided, which connects a bottom region of the reactor with an upper region of the reducing-agent tank 1 and serves to return excess urea-water solution. On the far side of the line 2, the reactor 3 is in communication with an ammonia reservoir 4, via a line 9. The ammonia reservoir 4 has an electric heater 5, symbolically represented by a heating coil. Exhaust gas lines discharge on diametrically opposite ends of the ammonia reservoir 4: a partial-flow supply line 28 on the side of the ammonia reservoir 4 toward the line 9, and a partial-flow evacuation line 30 on the side facing away from the line 9. At a point between the engine and the metering devices 15 and 16, the line 28 diverts a small quantity of exhaust gas, while the partial-flow evacuation line 30 returns the exhaust gas that has already passed through the ammonia reservoir 4 back to the exhaust gas line 20, specifically at a point between where the partial-flow supply line 28 branches off from the exhaust gas line 20 and the point where the metering devices discharge into the exhaust gas line 20. On the side of the ammonia reservoir 4 facing away from the line 9, a line 10 leads from the ammonia reservoir 4 to the valve 15, which is embodied to be electrically triggerable. An electronic control unit 32 is also provided, which via a signal input 34 receives both information about engine operating data and physical and/or chemical parameters detected by sensor elements, not shown. Via the control signal output 36, in accordance with an algorithm stored in the control unit 32, the feeding device, the metering devices 15 and 16, the electric heater 5, and optionally other additionally provided valve devices are all triggered.

The urea-water solution located in the reducing-agent tank 1 is a substance that at sufficiently high temperatures releases ammonia. In a normal operating mode (normal mode), the urea-water solution is delivered to the exhaust gas tract via the line 11, the pump 8, and the valve 16. In selected operating states, but not during a cold start of the motor vehicle, the urea-water solution is delivered to the reactor 3 via the line 2, by the provision of a valve, not shown but located in the line 2 that controls the flow of urea-water solution from the tank 1 into the reactor 3. The tank 1 is embodied as a pressurized tank. In the reactor 3, by the supply of heat energy (either via a further electric heater not shown or via an exhaust gas heat that is radiated from the exhaust gas line and adequately heats the reactor, if the reactor is located in the immediate vicinity of the exhaust gas line 20), a chemical conversion is induced, so that in the reactor 3, ammonia can be released, which is delivered to the intermediate reservoir 4 for storage via the line 9. Excess urea-water solution present in the reactor 3 can be returned to the reducing-agent tank 1 via the optional return line 6.

Possible method steps for operating the reactor 3 according to the invention will now be described, as examples: First, urea-water solution is fed from the tank 1 into the reactor 3 by means of a positive pressure gradient. The positive pressure gradient is either determined by the temperature level of the vessel, or generated by a pump, not shown. Next, thermal energy is for instance added to the reactor 3. Switching valves, not shown in the drawing, in the lines 6 and 9 along with a check valve, also not shown in the drawing, in line 2 bring about a pressure increase in the reactor. Under the conditions that now prevail in the reactor, the urea in the urea-water solution breaks down into ammonia and $CO_2$. When the mixture cools or expands, ammonia is outgassed and is transferred into the intermediate reservoir 4 by opening of the valve, not shown, in the line 9. The medium remaining in the reactor 3 is flushed back into the tank 1, and the procedure can begin over again.

Under selected operating conditions, especially on cold starting of a vehicle, if instead of the urea-water solution the ammonia stored in the ammonia reservoir is introduced into the exhaust gas tract, then the intermediate reservoir is subjected to a partial flow of exhaust gas via the partial-flow supply line 28, which is opened via a valve, not shown. The ammonia from the intermediate reservoir 4 is then fed into the exhaust gas tract via the line 10 and the metering device 15, which is opened under the control of the control unit 32. The release of ammonia from the intermediate reservoir is effected if need be with additional heat supplied via the electric heater 5. The intermediate reservoir here is formed by a zeolite body, for instance, which stores ammonia as a function of temperature. At low temperatures, the ammonia that is formed in the reactor is stored. If needed, heat is delivered, as already noted above, to the intermediate reservoir either directly (via the heater 5) or indirectly (via the partial flow of exhaust gas from the partial-flow supply line 28), causing the ammonia to be released again. An especially advantageous feature of this embodiment is that the zeolite body stores the ammonia selectively, even if the ammonia is contaminated with water or carbon dioxide. As a result, the intermediate reservoir can be simultaneously flushed out via the partial flow of exhaust gas from the partial-flow supply line 28, and the formation of intermediate products as the reservoir cools down can be avoided.

In an alternative embodiment, instead of a zeolite material, a salt that forms an ammonia complex can be used to form the intermediate reservoir. In a simpler version, the return line 6 may also be omitted. Even the partial-flow supply line and partial-flow evacuation line 28 and 30 may be omitted, in a simple embodiment. In that case, the expulsion of the ammonia is done solely via the electric heater 5. In a further alternative embodiment, a further pump may be provided in the line 2, to assure reliable feeding of the urea-water solution to the reactor. In a further embodiment, this pump may be embodied as a metering pump, and the pump 8 may likewise be embodied as a metering pump, so that the metering device 16 need not be embodied as a valve and is merely a nozzle that protrudes with its opening into the exhaust gas tract. In a further alternative embodiment, an electrically triggerable valve that is controlled via the signal output 36 of the control unit 32 may be provided in the line 6. This control or regulation may be done as a function of the temperature and/or of the level of urea-water solution in the reactor 3; the temperature and the fluid level are determined via appropriate sensors and, via the signal input 34 of the control unit 32, are incorporated in the form of measurement information into the control process of the exhaust gas posttreatment apparatus. In a further alternative embodiment, the partial-flow supply line and partial-flow evacuation line 28 and 30 may be provided with electrically triggerable valves. In a further alternative embodiment, the metering device 15 and/or the metering device 16 comprise only a constantly open nozzle, so that the control of the delivery of the first auxiliary agent via the metering device 15 and the delivery of the second auxiliary agent via the metering device 16 are effected exclusively via the metering pump 8, and the control of the electric heater and/or the delivery of exhaust gas is effected via the partial-flow supply line 28. In a simple alternative embodiment, the ammonia reservoir 4 may also be formed solely by a tank from which the expulsion of the ammonia is then effected, without an electric heater 5, exclusively via exhaust gas being expelled from the partial-flow supply line 28. In a further alternative embodiment, the tank need not be a tank that is constantly under pressure. In that case, either a further metering pump is provided in the line 2, or the line 2 does not lead directly into the tank but instead is connected to the line 11 downstream of the metering pump 8. In a further alternative embodiment, the ammonia is introduced into the exhaust gas tract via the line 30, and the line 10 can be omitted. In a further alternative embodiment, it may be provided that the first and second auxiliary agents are introduced into the exhaust gas tract at different points, and in particular downstream and upstream, respectively, of an oxidation catalytic converter located in the exhaust gas tract.

The foregoing relates to a preferred exemplary embodiment of the invention, it being understood that other variants and embodiments thereof are possible within the spirit and scope of the invention, the latter being defined by the appended claims.

The invention claimed is:

1. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein the intermediate reservoir, for being heated or for expelling the second auxiliary agent, is intermittently subjected to exhaust gas.

2. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein a substance that releases ammonia at sufficiently high temperatures is used as the first auxiliary agent.

3. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein, in a so-called normal operating mode of the engine, a delivery of the first auxiliary agent exclusively is effected, and wherein at selected time intervals outside the normal operating mode, in particular during a cold-starting phase of the engine, a delivery of the second auxiliary agent exclusively is effected, and wherein a substance that releases ammonia at sufficiently high temperatures is used as the first auxiliary agent.

4. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein, in a so-called normal operating mode of the engine, a delivery of the first auxiliary agent exclusively is effected, and wherein at selected time intervals outside the normal operating mode, in particular during a cold-starting phase of the engine, a delivery of the second auxiliary agent exclusively is effected, wherein the chemical conversion is effected during the normal operating mode, and wherein a substance that releases ammonia at sufficiently high temperatures is used as the first auxiliary agent.

5. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein the second auxiliary agent is ammonia.

6. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein, in a so-called normal operating mode of the engine, a delivery of the first auxiliary agent exclusively is effected, and wherein at selected time intervals outside the normal operating mode, in particular during a cold-starting phase of the engine, a delivery of the second auxiliary agent exclusively is effected, and wherein the second auxiliary agent is ammonia.

7. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein, in a so-called normal operating mode of the engine, a delivery of the first auxiliary agent exclusively is effected, and wherein at selected time intervals outside the normal operating mode, in particular during a cold-starting phase of the engine, a delivery of the second auxiliary agent exclusively is effected, wherein the chemical conversion is effected during the normal operating mode, and wherein the second auxiliary agent is ammonia.

8. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein a zeolite body or a salt that forms an ammonia complex is used as the intermediate reservoir.

9. A method for posttreatment of the exhaust gas of an internal combustion engine, in which nitric oxides contained in the exhaust gas are selectively catalytically reduced, the method comprising, delivering a first auxiliary agent from a supply thereof to the exhaust gas, subjecting a portion of the first auxiliary agent at least intermittently to a chemical conversion into a second auxiliary agent, storing the second auxiliary agent in an intermediate reservoir (4), and at least intermittently, delivering the second auxiliary agent to the exhaust gas parallel to or in alternation with the first auxiliary agent, wherein, in a so-called normal operating mode of the engine, a delivery of the first auxiliary agent exclusively is effected, and wherein at selected time intervals outside the normal operating mode, in particular during a cold-starting phase of the engine, a delivery of the second auxiliary agent exclusively is effected, and wherein a zeolite body or a salt that forms an ammonia complex is used as the intermediate reservoir.

* * * * *